April 21, 1970   E. R. CUNNINGHAM ET AL   3,507,429
APPARATUS FOR SEVERING STRIP MATERIAL
Original Filed April 10, 1967                    2 Sheets-Sheet 1
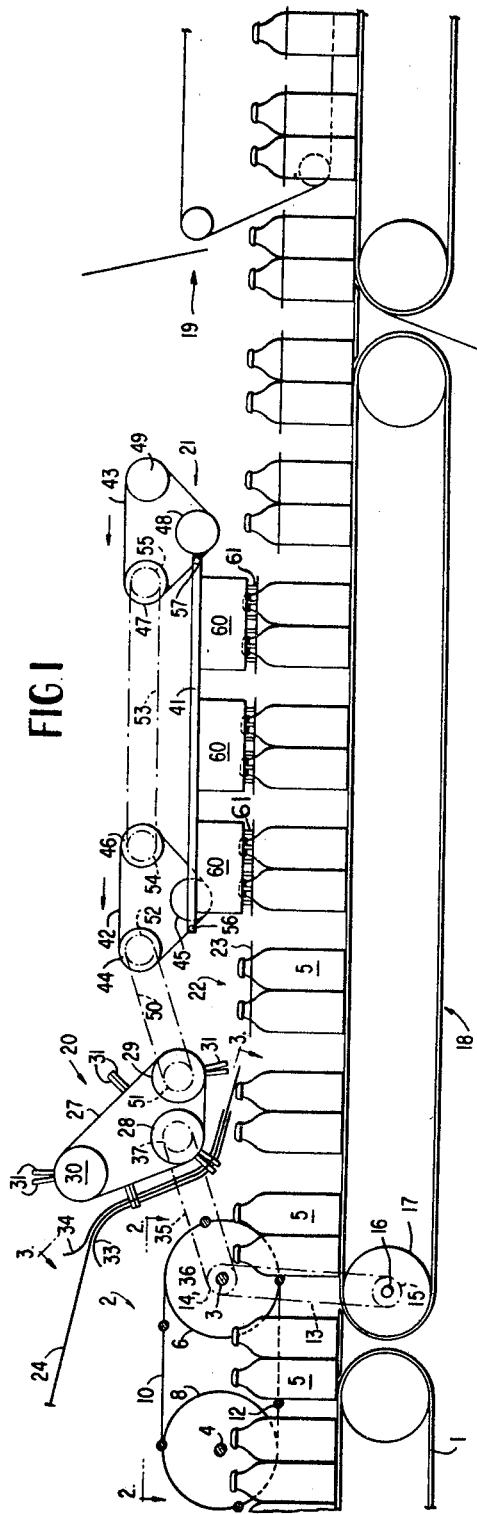
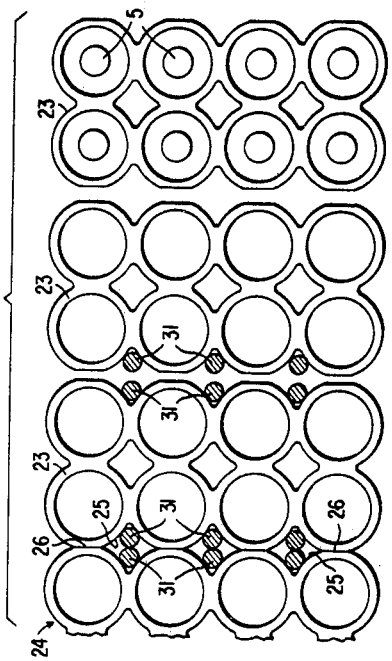
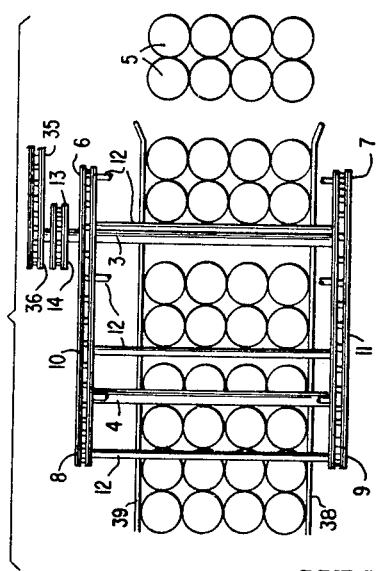
INVENTORS
ERNEST R. CUNNINGHAM
JOHN HOHL

INVENTORS
ERNEST R. CUNNINGHAM
JOHN HOHL

United States Patent Office 3,507,429
Patented Apr. 21, 1970

3,507,429
APPARATUS FOR SEVERING STRIP MATERIAL
Ernest R. Cunningham, Libertyville, Ill., and John Hohl, Ringgenberg, Bern, Switzerland; said Cunningham assignor to Illinois Tool Works, Inc., a corporation of Delaware, and said Hohl assignor to Owens-Illinois, Inc., a corporation of Ohio
Original application Apr. 10, 1967, Ser. No. 629,472, now Patent No. 3,447,280, dated June 3, 1969. Divided and this application Dec. 23, 1968, Ser. No. 810,878
Int Cl. B65h 35/10
U.S. Cl. 225—97         2 Claims

ABSTRACT OF THE DISCLOSURE

A method and apparatus for assembling resilient apertured carriers with groups of bottles to form packages convenient for carrying. Carriers are deposited on top of groups of bottles moving in spaced relation on a conveyor, then telescoped over the shoulder and into embracing relation with the body of the bottles to form packages. Apparatus is provided to sever individual carriers from strip material prior to the assembly operation.

---

This is a division of application Ser. No. 629,472, filed Apr. 10, 1967, now Patent No. 3,447,280, dated June 3, 1969.

It is common practice to merchandise many items such as canned foods, beer, soft drinks, or the like, in packages made up of a number of individual containers, with the package normally including a handle or other means to facilitate carrying the package. These packages are conventionally formed by feeding the individual containers onto a moving conveyor in two parallel, side-by-side rows, or files, and forming the containers into individual packages consisting of a like predetermined number of containers from each file. Thus, to form the well-known six-pack, the containers are formed into groups consisting of two files of three containers each, i.e., two files by three ranks.

One apparatus which is capable of assembling a group of bottles into a package is disclosed in a co-pending application entitled "Method and Apparatus for Packaging Containers," Ser. No. 428,406, filed Jan. 27, 1965, in the names of John Hohl (one of the inventors in the instant application) and Thomas L. Scribner, and assigned to one of the assignees of the present application. In this co-pending application, the bottles are fed onto a moving conveyor in spaced groups, and a resilient plastic apertured carrier is deposited onto the individual groups of bottles moving on the conveyor, with an aperture in the carrier surrounding the neck and resting on the shoulder of each bottle in the group. The carrier is subsequently advanced over the shoulder and into embracing relation with the body portion of the bottles to form a package.

While the apparatus of the above identified co-pending application is capable of forming groups of bottles into packages in the manner disclosed therein, it, and other known package forming apparatus of this general type, is not entirely satisfactory in that it cannot be readily employed to form packages of differing sizes. For example, such an apparatus employed to form the conventional six-pack cannot readily be employed to form a four-pack or an eight-pack. Also, the number of containers packaged by these prior devices remains substantially constant regardless of the number of containers in each package so that the number of packages produced in a given length of time varies substantially inversely as the number of containers in each package.

The present invention pertains to a method and an apparatus for forming a package similar to that formed by the apparatus disclosed in the above identified co-pending application and is, therefore, an improvement over the invention disclosed therein. Accordingly, it is the primary object of this invention to provide an improved method and apparatus for assembling bottles into packages convenient for carrying.

Another object is to provide an improved method and apparatus for assembling a resilient apertured carrier onto a group of bottles to form a package.

Another object is to provide such an apparatus which may readily be employed to form packages of different sizes.

Another object is to provide an apparatus which is capable of producing such packages at a substantially constant rate regardless of the number of containers in each package.

The foregoing and other objects are attained in an apparatus adapted for use with a high speed filling and capping machine to receive the filled, capped bottles issuing from the machine and form them into packages such as the familiar four, six, or eight-pack conventionally employed to merchanidse soft drinks and beer. The bottles to be packaged are fed by a novel feeding mechanism onto a horizontal belt conveyor in spaced groups by rank and file, typically two ranks by three files, or two ranks by four files. The groups of bottle maintain their initial spaced relation on the conveyor throughout their movement through the package forming apparatus.

From the group forming mechanism, the spaced groups of bottles pass beneath a carrier feeding mechanism where a resilient apertured carrier is deposited loosely on top of each group with the neck of each bottle in the group projecting through an aperture in the carrier. The carrier feeding mechanism automatically severs the individual carriers from an elongated strip of carriers, so that the individual carriers are permitted to drop free in timed relation with respect to the movement of the bottles on the conveyor. The groups of bottles with the carrier positioned thereon then move through the carrier applying station where a plurality of individual carrier applying heads each engage the carrier on a separate group of containers to advance the carrier over the shoulder and into embracing relation with the body portion of the bottles of a plurality of groups of bottles simultaneously as the groups continue to move on the conveyor. From the carrier applying station, the packaged bottles may move to a separate wrapping, banding or casing apparatus, as desired.

Other objects and advantages of the invention will become apparent from the following specification taken with the drawings, in which:

FIG. 1 is a side elevation view schematically showing a package assembling apparatus according to the present invention;

FIG. 2 is a partial plan view along line 2—2 of the apparatus shown in FIG. 1 illustrating a mechanism for forming bottles into groups on the conveyor of the apparatus;

FIG. 3 is a fragmentary sectional view taken along line 3—3 and illustrating the carrier separating feature of the carrier feeding mechanism;

Figure 7:
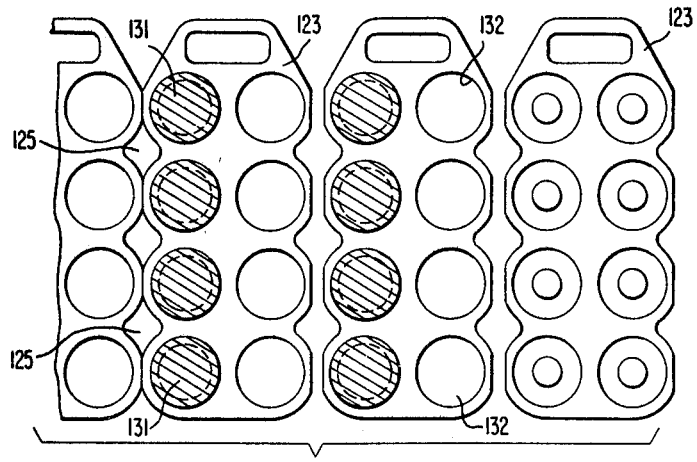
FIG. 7 is a view similar to FIG. 3 and illustrating an alternate embodiment of the carrier separating mechanism.

Referring now to the drawings, an apparatus embodying the present invention as illustrated as including an infeed conveyor 1 for receiving filled bottles discharged from a high speed filling and capping machine, not shown. The infeed conveyor moves the bottles into a novel grouping and feeding mechanism 2 which forms the bottles into suitable groups by rank and file, typically two ranks by two, three, or four files, with four files being illustrated in FIGS. 2 and 3 of the drawings.

As illustrated in FIG. 2 the group forming mechanism comprises a pair of shafts 3, 4 supported by suitable brackets, not shown, for rotation about spaced parallel axes extending transversely across conveyor 1 above the top of the bottles 5. A pair of sprocket wheels 6, 7 are mounted one adjacent each end of shaft 3 for rotation therewith, and a second pair of sprocket wheels 8, 9 are mounted on shaft 4, one adjacent each end thereof. A first chain 10 extends around sprocket wheels 6 and 8 for rotation therewith, and a second chain 11 extends around sprockets 7 and 9. A plurality of elongated spacer bars 12 are mounted on the chains 10, 11 with the respective bars 12 having their axes parallel to the axes of the shafts 3 and 4. The respective bars 12 have their opposed ends mounted on the chains 10 and 11 at intervals spaced therealong equal to the desired spacing of the successive groups of bottles to be fed from the mechanism. The chains 10 and 11 and the spacing bars 12 are driven around an endless path by a chain 13 extending over a sprocket 14 rotatably fixed on the end of shaft 3. Chain 13 extends around and is driven by a sprocket 15 mounted on the shaft 16 of one end roller 17 of a driven belt conveyor 18.

An elongated fixed guide rail 38 extends parallel to the conveyor 1, between the conveyor and the feeding mechanism 2, adjacent the chain 11. A second guide rail 39 extends parallel to rail 38, in laterally spaced relation thereto, with the rails 38, 39 cooperating to define a limited path through which the containers are fed to thereby limit the number of containers in the individual rows, or ranks, passing through the feeding mechanism. The guide rail 39 is adjustable transversely of the conveyor 1 so that the number of containers in the individual ranks may readily be varied. Thus, the number of containers in the groups may be varied from a minimum of two to a maximum determined by the length of the feed bars 12 without in any way affecting the number of groups of containers fed by the mechanism.

The belt conveyor 18 extends from the discharge end of the bottle grouping mechanism 2 to convey the groups of bottles fed therefrom successively beneath the carrier dispensing mechanism 20 and a carrier applying mechanism 21. From the carrier applying mechanism, the conveyor 18 delivers the packaged bottles for further handling or processing such as by the package wrapping mechanism illustrated generally at 19.

Referring to FIGS. 1 and 3, it is seen that the individual groups 22 of bottles are moved on conveyor 18 beneath carrier feeding mechanism 20 where a resilient apertured carrier 23 is fed onto each of the groups moving thereunder. Preferably, the carriers 23 are formed from a relatively thin sheet of elastic, plastic material such as polyethylene with the individual carriers 23 being integrally joined into an elongated strip 24 which may be wound upon a reel, not shown, and unwound therefrom for feeding by the feeding mechanism 20. The carrier strip 24 has a plurality of openings 25 formed therein between adjacent carriers 23, and the strip is weakened along a score line 26 extending transversely of the strip 24 through the openings 25 so that the individual carriers may readily be broken from the strip by the feeding mechanism as described hereinbelow.

The feeding mechanism 20 comprises a chain 27 extending in an endless path over a driven sprocket 28 and a pair of idler sprockets 29, 30. A plurality of pairs of outwardly extending fingers 31 are mounted on chain 27 at spaced intervals therearound, with the spacing of the pairs of fingers corresponding to the spacing between openings 25 of successive carriers 23 in strip 24. The individual fingers of each pair are mounted on adjacent links of the chain 27, and normally extend perpendicularly therefrom in adjacent parallel relation to one another. However, as the individual fingers of each pair are mounted on separate links of chain, they will be separated as the chain is moved around the convex portion of its path defined by the sprockets 28, 29 and 30 as illustrated in FIG. 1.

The carrier strip 24 is guided in substantially parallel spaced relation to the chain 27 along a portion of its path by spaced parallel guide plates 33, 34. The fingers 31 carried by the chain 27 project outwardly from the chain between slots, not shown, in the guide plates 33, 34 to project through the openings 25 in strip 24 to feed the carriers between the guides 33, 34 as the chain 27 is driven around its path. As best seen in FIG. 1, separation of the fingers 31 of each pair of fingers as they move around the convex portion of their path defined by the periphery of sprocket 28 separates a carrier 23 from the strip 24 by breaking the carrier along the weakened score line 26.

When the apparatus is to be employed to package containers which are fed in two files only, the single chain feeding mechanism described above is adequate. However, the apparatus will normally be employed to package containers fed in ranks of three or more, in which case a plurality of sets of fingers are provided in a transverse row so that a set of fingers project through each of the openings 25 of the strip 24 as shown in FIG. 3. This is accomplished by providing a pair of laterally spaced chains, with bars projecting between and mounted on the chains to carry the fingers 31 much in the same manner as the spacer bars 12 mounted on the chains 10–11 of the group forming mechanism. The number of fingers 31 provided will, of course, be determined by the maximum number of containers which the feeding mechanism 2 is capable of feeding in a single rank. The extra fingers will not in any way interfere with the packaging operation when less than the maximum number of containers are fed in the individual groups 22.

As shown in FIG. 1, the individual carrier is projected downwardly into the path of a group of bottles moving on conveyor 18 so that the necks of the leading rank of bottles project through the apertures in the carrier. Thus, when the individual carrier is severed from the strip by separation of the fingers 31, the carrier will be guided by the necks of these bottles so that the carrier will fall onto the group of bottles with a bottle neck projecting through each of the apertures in the carrier and with the carrier resting on the shoulder of said bottles. Preferably, carrier feed mechanism 20 is driven by a chain 35 extending between a sprocket 36 on shaft 3 and a sprocket 37 mounted on sprocket 28, so that the container feeding mechanism 2 and the carrier feeding mechanism 20 are maintained in synchronism.

From the carrier feed mechanism 20, the individual groups 22, each having a carrier 23 positioned on the shoulders of the bottles, are moved through a carrier applying mechanism 21 where the carrier is advanced simultaneously over the shoulder of the bottles and into embracing relation with the cylindrical body portion of each of the bottles. As illustrated schematically in FIG. 1, the carrier applying mechanism comprises an elongated beam 41 supported in vertically spaced parallel relation above conveyor 18 by a pair of chains 42, 43. The chains 42, 43 are each supported for movement around an endless, generally triangular path, with beam 41 having one end supported on chain 42 and its other end supported on chain 43 for movement therewith. The chain 42 is supported by a driven sprocket 44, in idle sprocket 45 and a driving sprocket 46, and chain 43 is supported by a driven sprocket 47 and idler sprockets 48 and 49. The sprocket 44 is driven by a chain 50 extending over a sprocket 51 rotatably fixed on the sprocket 29 of carrier feed mechanism 20 and a sprocket 52 rotatably fixed on sprocket 44. Similarly, chain 43 is driven by a chain 53 extending around a sprocket 54 rotatably fixed on sprocket 46 and a sprocket 55 rotatably fixed on a sprocket 47. Beam 41 is pivotally supported on chain 42 by a pin connection 56 and on chain 43 by a pin connection 57. Thus, by driving chains 42 and 43 at the same rate, the beam 41 is moved around a triangular path corresponding to the traingular paths followed by the chains 42, 43.

A plurality of carrier applying heads 60 are mounted on the beam 41, with the heads 60 being spaced on beam 41 at intervals corresponding to the spacing of the groups of bottles 22 moving on the conveyor 18. The carrier applying heads 60 are of the general type illustrated in our above mentioned co-pending patent application, and include a plurality of resiliently biased fingers 61 adapted to engage the inner periphery of the individual apertures of the carriers to force the carriers over to the shoulders of the bottles as the heads 60 are forced downwardly by beam 41.

By synchronizing the rate of movement of the chains 42, 43 with that of the conveyor, the horizontal component of movement of the beam 41 along the length of conveyor 18 can be made substantially equal to the rate at which the conveyor 18 is moving as the beam moves down the first segment of its triangular path, i.e., that portion inclined downwardly toward and longitudinally along the length of the conveyor, and up the second segment of its path, i.e., that portion inclined upwardly from and longitudinally along the conveyor. This rate will, of course, vary slightly as the beam 41 departs from a true triangular path to move around the rounded corner defined by the sprockets 45, 48. However, by maintaining the angle between the first and second segments of the path fairly large, this variation will not be sufficiently great to upset the bottles on the conveyor or to cause slippage of the bottles.

By coordinating the movement of the bottle group feeding mechanism 2, the carrier feeding mechaism 20, and the carrier applying mechanism 21, each of the carrier applying heads 60 will be in vertical alignment with a group of bottles having a carrier 23 supported on their shoulder as the beam 41 moves downwardly toward the conveyor 18. Also, by providing an appropriate length for the chains 42, 43, depending upon the number of carrier heads 60 supported on the beam 41, any desired number of groups of bottles may have the carrier 23 applied thereon simultaneously.

Figure 4:
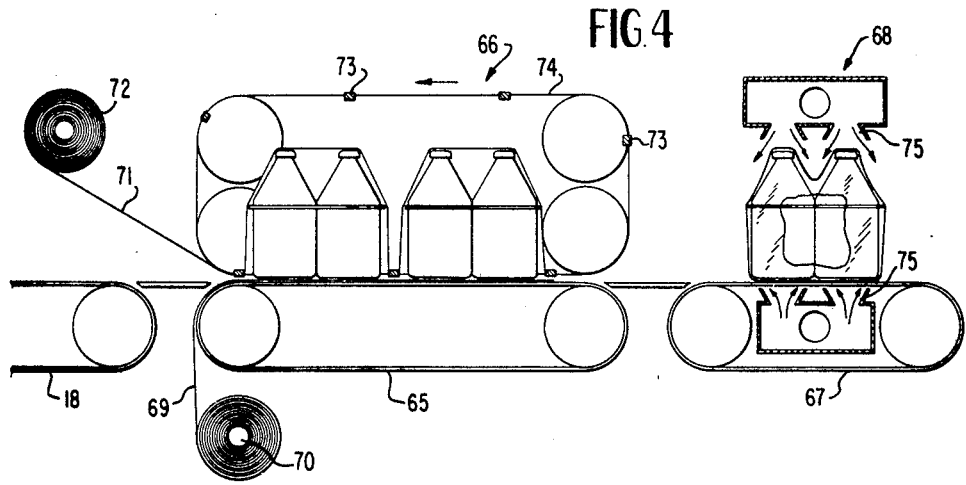
FIG. 4 is a schematic showing of a mechanism employed to apply and shrink a heat-shrinkable wrapping onto the package formed by the apparatus.
Figure 5:
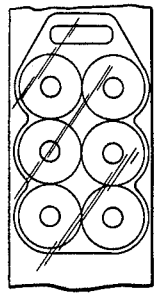
FIG. 5 is a top plan view of a package having a heat-shrinkable wrapping loosely formed thereon.

As illustrated schematically in FIG. 4, the packages of containers move from the carrier applying station through a wrapping mechanism illustrated generally at 19. This wrapping mechanism may consist of a first driven belt conveyor 65 for conveying the packages through an initial wrapping mechanism illustrated generally at 66, and a second driven belt conveyor 67 for conveying the wrapped packages past a heat-shrinking station illustrated generally at 68. A continuous web of a heat-shrinkable plastic film 69 is fed from a reel 70 onto the supporting surface of belt 65 so that the packages are supported thereon. A second web of heat-shrinkable plastic film 71 is fed from a second reel 72 and deposited loosely over the top of the packages. A plurality of wrapping bars 73 mounted on an endless chain drive mechanism, illustrated generally at 74, wraps the top film 71 over the top of the individual packages and downwardly between successive packages into engagement with the lower film 69. The bars 73 are suitably heated to seal and cut off the two sheets of film to produce individual, loosely wrapped packages as illustrated in FIG. 5.

Figure 6:
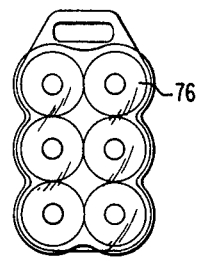
FIG. 6 is a top plan view of the completed package.

The loosely wrapped packages are discharged from conveyor 65 onto conveyor 67, which conveys them past a series of nozzles 75 discharging a blast of hot air to quickly shrink the plastic film and form a tightly wrapped package 76 as shown in FIG. 6.

Referring now to FIG. 7, an alternate embodiment of the invention is illustrated in which a series of cylindrical plugs 131 are substituted for the pairs of fingers 31 of the first described embodiment. In this embodiment, the cylindrical plugs 131 project through the circular bottle-receiving apertures 132 of the individual carriers 123. The diameter of the plugs 131 are substantially equal to the diameter of the apertures 132. Since the spacing between successive plugs 131 is greater than that between successive fingers 31, there will be a greater separation upon movement of the plugs around the curved portion of their endless path to thereby provide a more positive separation of the individual carriers 123. Also, by maintaining the diameter of the individual plugs substantially equal to the diameter of the aperture through which it projects, the tendency of the carriers to buckle will be minimized and a more positive separation will be assured.

In summary, the individual bottles to be packaged are moved from a high speed filling and capping machine to the grouping and feeding mechanism where they are automatically arranged by rank and file between the guide rails 38 and 39 by the action of the continuously driven conveyor belt 1. The guide rail 39 is adjusted to permit the desired number of bottles to be formed in each rank, and the grouping and feeding mechanism 2 separates and feeds the bottles in spacer groups onto the driven conveyor 18. It is noted that the spacing between successive groups of bottles will remain constant regardless of the number of bottles in the individual group so that the number of packages which the apparatus is capable of forming is unaffected by the number of the bottles in the individual package.

The carrier feeding mechanism and the carrier applying mechanism are each constructed to accommodate a group of bottles of the maximum size capable of being fed by the feeding mechanism and, therefore, no adjustment to this portion of the apparatus is required when changing from one size package to another. It is only necessary to provide the correct size of carrier web 24.

While we have described preferred embodiments of our invention, we wish it understood that we do not intend to be restricted solely thereto, but that we do intend to include all embodiments thereof which would be apparent to those skilled in the art and which come within the spirit and scope of our invention.

We claim:

1. An apparatus for feeding and separating an interconnected strip of resilient apertured plastic carriers into individual carrier units for subsequent assembly to a plurality of bottles or the like comprising, endless conveyor means entrained about a plurality of sprockets at least one of which is driven, a plurality of pairs of finger elements mounted on said endless conveyor means, the individual fingers of each said pair being arranged with respect to one another to provide relative separating movement therebetween as they are moved around said sprockets, and means for directing said strip of resilient apertured carriers into proximity to said conveyor means with the said finger elements projecting through apertures formed in said interconnected strip of carriers to feed said strip, the relative separating movement between the finger elements in each pair causing tearing of the interconnected strip along weakened areas between adjacent carrier units.

2. The apparatus defined in claim 1 wherein one finger of each said pair of fingers projects through an aperture in successive interconnected carrier units of said strips of carriers.

References Cited

UNITED STATES PATENTS 3,103,163    9/1963    Gates _____ 225—100 X

JAMES M. MEISTER, Primary Examiner

U.S. Cl. X.R.

225—98, 100